US009275220B2

(12) United States Patent
Dubey et al.

(10) Patent No.: US 9,275,220 B2
(45) Date of Patent: Mar. 1, 2016

(54) MULTIPLE INPUT BASED PASSWORDS (71) Applicant: International Business Machines Corporation, Armonk, NY (US)

(72) Inventors: Anuj Dubey, Kanpur (IN); Maruthi Latha, Bangalore (IN); Rohit Shetty, Bangalore (IN); Anurag A. Sinha, Gorakhpur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/305,027

(22) Filed: Jun. 16, 2014

(65) Prior Publication Data

US 2015/0363592 A1    Dec. 17, 2015

(51) Int. Cl.
*G06F 21/00* (2013.01)
*G06F 21/46* (2013.01)
*G06F 21/31* (2013.01)
*H04L 29/06* (2006.01)

(52) U.S. Cl.
CPC ............... *G06F 21/46* (2013.01); *G06F 21/31* (2013.01); *H04L 63/083* (2013.01); *H04L 63/10* (2013.01)

(58) Field of Classification Search
CPC ..... G06F 3/017; G06F 3/0488; G06F 3/0416; G06F 3/0426; G06F 3/0304; G06F 3/04886; G06F 21/32; G06F 21/83; G06F 2221/2101; G06F 2203/04104; G06F 21/31; G06F 21/46; H04L 9/3213; H04L 9/3226; H04L 63/10; H04L 63/0853; H04L 63/083; H04L 2209/80
See application file for complete search history.

(56) References Cited

U.S. PATENT DOCUMENTS

| 8,027,518 | B2 | 9/2011 | Baker et al. | |
| 2004/0041998 | A1* | 3/2004 | Haddad | ............................ 356/71 |
| 2005/0138392 | A1* | 6/2005 | Johnson et al. | ................ 713/186 |
| 2008/0317292 | A1* | 12/2008 | Baker et al. | ................... 382/115 |
| 2013/0265218 | A1 | 10/2013 | Moscarillo | |
| 2014/0115694 | A1* | 4/2014 | Fadell et al. | .................... 726/19 |

FOREIGN PATENT DOCUMENTS

| EP | 2528010 A1 | 11/2012 |
| WO | 2013059488 A1 | 4/2013 |

OTHER PUBLICATIONS

Dubey, A. et al. U.S. Appl. No. 14/479,386, filed Sep. 8, 2014.
Appendix P List of IBM Patents or Patent Applications Treated as Related.

(Continued)

*Primary Examiner* — Amir Mehrmanesh
(74) *Attorney, Agent, or Firm* — John W Hayes; William H. Hartwell (57) ABSTRACT

A computer-implemented method, carried out by one or more processors, for utilizing one or more input methods for passwords. In an embodiment, the method comprises the steps of determining, by one or more processors, one or more input methods supported for a password entry, wherein the password entry verifies a user's credentials; receiving, by one or more processors, a candidate password through the one or more input methods, wherein each character of the candidate password has an associated input method; and storing, by one or more processors, the candidate password as the password entry, along with the associated input method for each character of the candidate password.

8 Claims, 5 Drawing Sheets

(56) References Cited

OTHER PUBLICATIONS

Cheng, K.Y., et al. "Contactless Finger Knuckle Identification using Smartphones". <http://www4.comp.polyu.edu.hk/~csajaykr/myhome/papers/BIOSIG12a>.
Ebdrup, N. "Texting with your eyes ScienceNordic". Jan. 16, 2012.
Fingas, J. "Moto X Touchless Control update lets you speak your unlock code". Dec. 13, 2013.
Fu, E. "CMU team creates TapSense, an improved touchscreen technology (video)". Oct. 21, 2011.
Harrison, C., et al. "TapSense: Enhancing Finger Interaction on Touch Surfaces". UIST' 11, Oct. 16-19, 2011. Santa Barbara, CA. Copyright 2011. ACM.
Kumar, M., et al. "Reducing Shoulder-surfing by Using Gaze-based Password Entry". Stanford CSTR May 2007, Stanford, CA.
"QEEXO". Homepage. Copyright 2014. [online] [retrieved on: Mar. 21, 2014]. <http://www.qeexo.com>.

* cited by examiner

MULTIPLE INPUT BASED PASSWORDS

BACKGROUND

In the present day, touch based electronic devices are widely utilized in day to day scenarios. Common touch based electronic devices can include tablet computers, automated teller machines (ATMs), medical devices, and smartphones. A touchscreen enables a user to directly interact with the content being displayed without a secondary input device, such as, a mouse, touchpad, stylus, or any other intermediate device. When utilizing a touch based electronic device, the user may encounter a scenario where security credentials are verified in order for access to be granted to a resource. The user can typically utilize a conventional virtual keyboard to input security credentials, which when inputted correctly grant the user access to the resource. However, in an example scenario where the user is prompted for security credentials in the form of a pin number to gain access to account information at an ATM, the typical pin number is a four digit number which is simple to remember, but can be relatively easy to emulate.

SUMMARY

Embodiments of the present invention disclose a method, computer program product and computer system for utilizing one or more input methods for passwords. A computer-implemented method, carried out by one or more processors, for utilizing one or more input methods for passwords comprises the steps of determining, by one or more processors, one or more input methods supported for a password entry, wherein the password entry verifies a user's credentials; receiving, by one or more processors, a candidate password through the one or more input methods, wherein each character of the candidate password has an associated input method; and storing, by one or more processors, the candidate password as the password entry, along with the associated input method for each character of the candidate password.

DETAILED DESCRIPTION

Embodiments in accordance with the present invention utilize one or more input methods for passwords by determining which one or more input methods are supported for a password entry, where the password entry verifies a user's credentials. The verification of credentials allow a user to gain access to a resource. Embodiments in accordance with the present invention receive a candidate password through the one or more input methods, where each character of the candidate password has an associated input method. Embodiments in accordance with the present invention store the candidate password as the password entry, along with the associated input method for each character of the candidate password.

Figure 1:
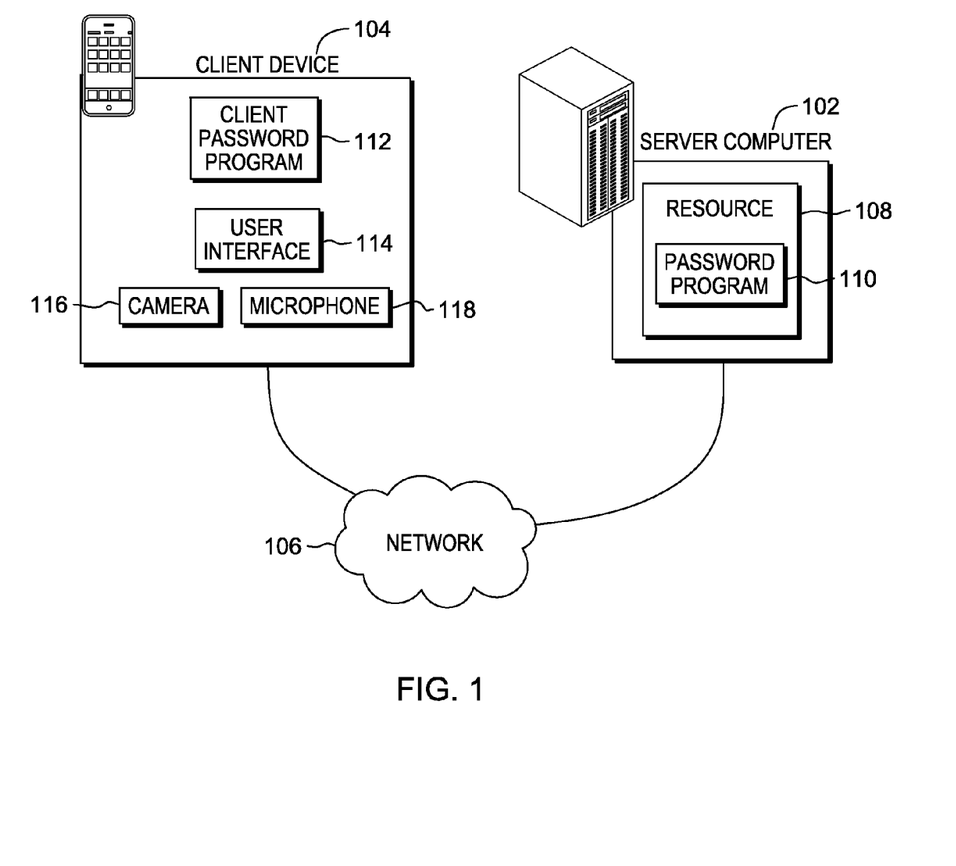
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102 and client device 104 interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine readable program instructions and communicating with other computer devices via a network. In this embodiment, server computer 102 has the ability to communicate with other computer devices to query the computer devices for information.

In this embodiment, resource 108 residing in server computer 102 includes password program 110. In another embodiment, resource 108 does not include password program 110 but in any configuration resource 108 can communicate with password program 110. Examples of resource 108 can include a website, a database, or any remotely accessible medium which can request credential verification of a user. Password program 110 handles the verification of credentials of the user for resource 108.

Password program 110 has the ability to create a password entry, where each password entry represent a user's credential verification for accessing resource 108. Password program 110 can determine input methods for the password entry, where the example input methods can be of an audible, a visual, and of a physical nature. Password program 110 can include the criteria which a candidate password can meet prior to password program 110 creating the password entry for the candidate password. Subsequent to the password program 110 creating the password entry based on the candidate password, password program 110 can utilize the password entry when performing credential verification when a user of client device 104 is attempting to access resource 108.

In one embodiment, password program 110 can receive a password for verification from the user of client device 104. In another embodiment, client password program 112 located on client device 104 can provide a medium between the user of client device 104 and password program 110. Client password program 112 can receive input information through various components of client device 104 such as, user interface 114, camera 116, and microphone 118. The user of client device 104 can utilize user interface 114 for the physical input method, camera 116 for the visual input method, and microphone 118 for the audible input method.

In general, network 106 can be any combination of connections and protocols that can support communications between server computer 102 and client device 104. Network 106 can include, for example, a local area network (LAN), a wide area network (WAN), such as the internet, a cellular network, or any combination of the preceding, and can further include wired, wireless, and/or fiber optic connections.

In one embodiment, password program 110 can be a web service accessible via network 106 to a user of a separate device, such as client device 104. In another embodiment, password program 110 may be operated directly by a user of server computer 102.

In various embodiments of the present invention, client device 104 can be a laptop computer, a tablet computer, a netbook computer, a personal computer (PC), automated teller machines (ATMs), a medical device, a personal digital assistant (PDA), a smartphone, or any programmable electronic device capable of receiving at least inputs and communicating with server computer 102 via network 106.

User interface (UI) 114 on client device 104 displays information that any one of the processes of password program 110 may display to a user. User interface 114 can be, for example, a graphical user interface (GUI) or a web user interface (WUI) that displays text, documents, web browser windows, user options, application interfaces and instructions for operation. User interface 114 also has the ability to receive user inputs for password program 110. In another embodiment, user interface 114 has the ability to receive user inputs for client password program 112.

Figure 2:
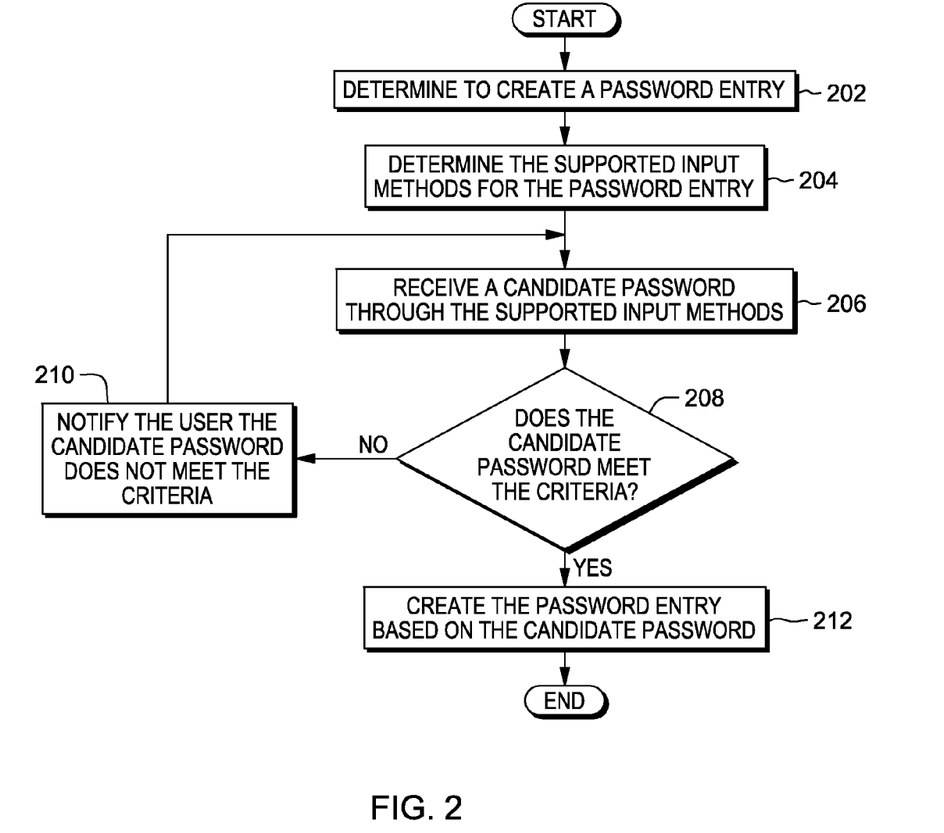
FIG. 2 is a flowchart depicting operational steps of a password program for creating a password entry utilizing multiple inputs, in accordance with an embodiment of the present invention.

FIG. 2 is a flowchart depicting operational steps of a password program for creating a password entry utilizing multiple inputs, in accordance with an embodiment of the present invention.

Password program 110 determines to create a password entry (step 202). In this embodiment, password program 110 is managing credential verification for access to a resource, such as, an online bank account. A user of client device 104 can create a username and a password unique to the online bank account. Password program 110 can determine to create the password entry and associate the password entry with the username. In another embodiment, password program 110 can receive a request to alter an existing password entry with a new password entry, which password program 110 can associate with an existing username.

Password program 110 determines the supported input methods for the password entry (step 204). In this embodiment, password program 110 can query client device 104 for information concerning input methods. Password program 110 can query client device 104 to determine if client device 104 includes a touch screen, where the touch screen is capable of displaying a virtual keyboard and receiving physical inputs. The virtual keyboard on the touch screen of client device 104 can allow a user to utilize different parts of a hand when selecting a character on the virtual keyboard. For example, when a user selects the character "A" on the virtual keyboard of client device 104, the user can select the character "A" with at least one or more pads of the fingers, one or more finger tips, one or more knuckles, or one or more nails of the fingers. Password program 110 can associate the selected character "A" with the at least one or more pads of the fingers, one or more finger tips, one or more knuckles, or one or more nails of the fingers. Password program 110 can associate the other characters of the password entry in the same manner.

Password program 110 can query client device 104 to determine if client device 104 includes a camera capable of eye motion detection. Password program 110 can utilize eye detection software to determine eye based inputs received from camera 116 of client device 104. Password program 110 can query client device 104 to determine if client device 104 includes a microphone, where the microphone is capable of receiving audible characters. Password program 110 can receive audible transmissions from microphone 118 of client device 104, where each audible transmission contains a character of a password entry.

Password program 110 can combine two or more input methods in creating the password entry according to the specification provided by a user. For example, a user is creating a password where the word is "PASSWORD". Password program 110 allows for the user to use physical inputs for the first portions of the password and audible inputs for the second portion of the password. As a result, the user has physically entered the first portion of the password, "PASS" using the virtual keyboard on the touch screen. The user audibly enters the second portion of the password, "WORD" by audibly projecting each character of the second portion of the password. In another embodiment, the user can audibly enter password by audibly projecting the whole word rather than audibly projecting each character of the word.

Password program 110 receives a candidate password through the supported input methods (step 206). In this embodiment, password program 110 previously determined the supported input methods include physical and audible. Password program 110 can receive the candidate password in portions depending on the number of input methods the user is utilizing. For example, a candidate password is "PASSWORD", where a user utilizes physical inputs for the first portion, "PASS" and audible inputs for the second portion "WORD". Password program 110 can receive the physical and audible inputs in a sequential order, where the physical portion of the password is received first and the audible portion of the password is received second. Password program 110 has the ability to query the user to determine if the received portions of the password are in the correct sequential order. If the sequential order is incorrect, password program 110 can receive an input from the user specifying the correct sequential order for the two portions of the password.

Password program 110 determines if the candidate password meets the criteria (decision step 208). In the event password program 110 determines the candidate password does not meet the criteria ("no" branch, step 208), password program 110 notifies the user that the candidate password does not meet the criteria (step 210). In the event password program 110 determines the candidate password does meet the criteria ("yes" branch, step 208), password program 110 creates the password entry based on the candidate password (step 212).

In one embodiment, password program 110 utilizes the criteria based on the number of input methods utilized for the candidate password. For example, the criteria can call for the candidate password to have two input methods and if the candidate password has only one input method, password program 110 can determine the candidate password does not meet the criteria. Password program 110 can also alter the password criteria depending on the supported input methods for password entry, previously determined in step 204. In another embodiment, password program 110 utilizes the criteria based on the number of characters in the candidate password. For example, the criteria can call for the candidate password to have a minimum of 6 characters and if the candidate password has only 5 characters, password program 110 can determine the candidate password does not meet the criteria. In yet another embodiment, password program 110 utilizes the criteria based on a list of common known passwords. For example, the criteria can call for the candidate password to be different from a pre-established list of common passwords which can be easily deciphered. Password program 110 can also have any combination of the previously mentioned embodiments in the criteria.

Password program 110 notifies the user the candidate password does not meet the criteria (step 210). In this embodiment, password program 110 can send a notification to client device 104 to display in user interface 114 that the candidate password does not meet the criteria. In the notification, password program 110 can specify which portion of the criteria was not met. For example, password program 110 utilizes the criteria calling for two input methods but the candidate password only utilizes one input method. Password program 110 can notify the user that only one type of input method was utilized and can provide a recommendation of other possible input methods depending on the previously determined supported input methods for the password entry in step 204.

Password program 110 creates the password entry based on the candidate password (step 212). In this embodiment, password program 110 can associate the candidate password with a username, where a username and password combination is unique to a particular user, such as the user of client device 104. Password program 110 creates the password entry by storing the candidate password associated with the username in a repository containing other password and username entries. Password program 110 stores the candidate password along with the one or more input methods for each character of the password.

Figure 3:
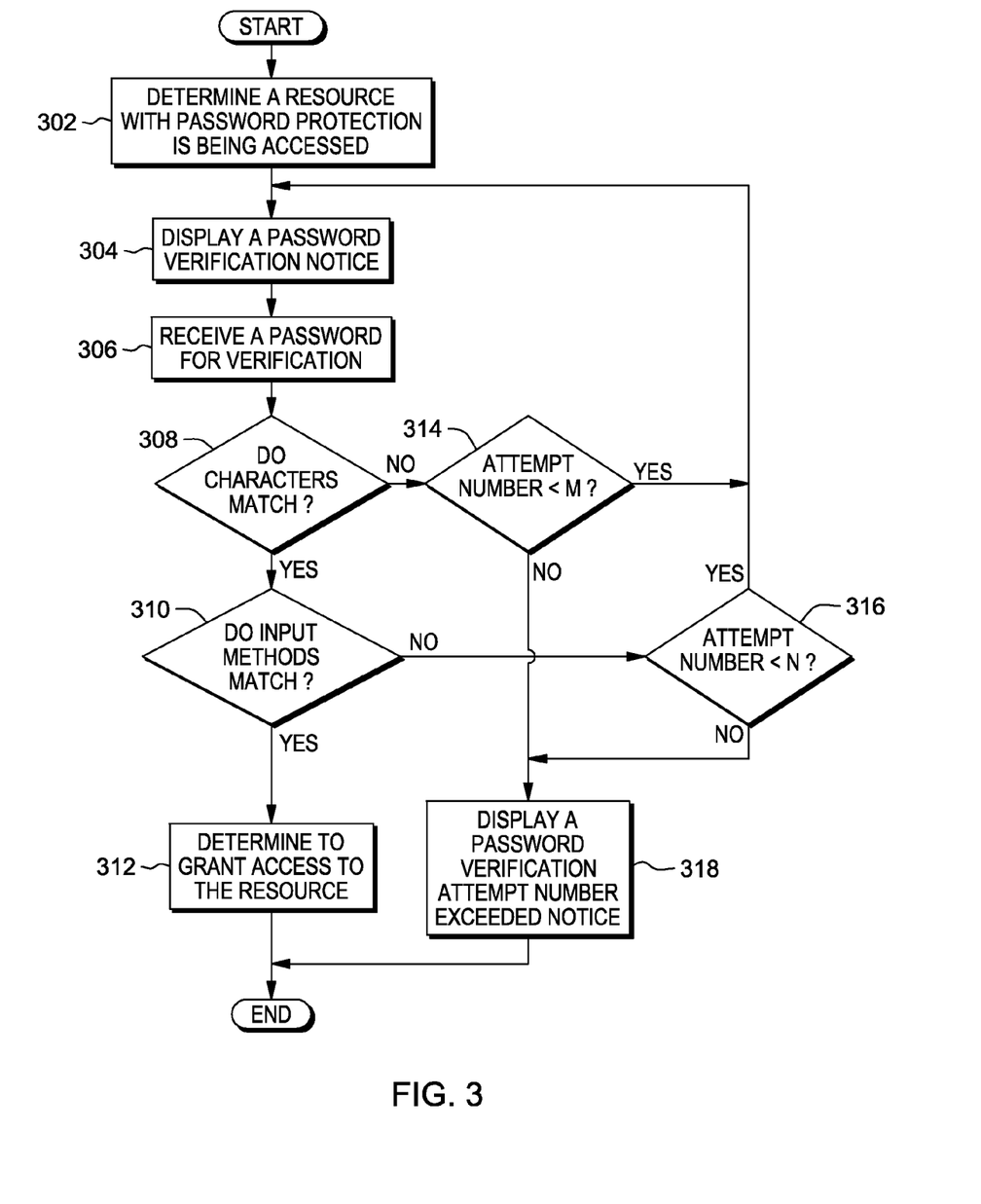
FIG. 3 is a flowchart depicting operational steps of a password program for verifying a received password based on a password entry utilizing multiple inputs, in accordance with one embodiment of the present invention.

FIG. 3 is a flowchart depicting operational steps of a password program for verifying a received password based on a password entry utilizing multiple inputs, in accordance with one embodiment of the present invention.

Password program 110 determines a resource with password protection is being accessed (step 302). In one embodiment, a user of client device 104 is attempting to access a resource, where the resource is an online bank account. Password program 110 can determine the online bank account being accessed by the user of client device 104 calls for a username and password combination in order for access to be granted. In another embodiment, password program 110 determines a file system in a database is being accessed by a user of client device 104, where the file system calls for a password in order for access to be granted.

Password program 110 displays a password verification notice (step 304). In one embodiment, password program 110 can display a password verification notice in a user interface on a client device of a user trying to access a resource with password protection. In one example, the notice can include a field for username entry and another field for password entry. Password program 110 can specify in the notice a number of input methods when entering the password. Password program 110 can also specify in the notice an order for the input methods of the password.

Password program 110 receives a password for verification (step 306). In this embodiment, password program 110 receives a password for verification utilizing a single input method. The single input method includes the user utilizing at least one or more pads of the fingers, one or more finger tips, one or more knuckles, or one or more nails of the fingers on a virtual keyboard to enter a password for verification. Password program 110 receives a word, "PASSWORD" for password verification, where each character of the word was entered utilizing a different part of a user's hand (e.g., knuckle).

Password program 110 determines if the characters of the received password match the password entry (decision step 308). In the event password program 110 determines the characters of the received password do not match the password entry ("no" branch, step 308), password program 110 determines if the attempt number is less than a number (M) of permissible attempts when characters do not match (decision step 314). In the event password program 110 determines the characters of the received password do match the password entry ("yes" branch, step 308), password program 110 determines if the input methods for the received password match the password entry (decision 310). In one embodiment, password program 110 determines the characters of a received password match a password entry regardless if a character is represented in lower case or upper case form. In another embodiment, password program 110 determines the characters in the received password have to match a correct lower case or upper case form of the password entry.

Password program 110 determines if the input methods for the received password match the password entry (decision step 310). In the event password program 110 determines the input methods for the received password do not match the password entry ("no" branch, step 310), password program 110 determines if the attempt number is less than a number (N) of permissible attempts when input methods do not match (decision step 316). In the event password program 110 determines the input methods for the received password do match the password entry ("yes" branch, step 310), password program 110 determines to grant access to the resource (step 312). In one embodiment, password program 110 can display in a user interface that a received password matched the password entry and access has been granted to the resource with password protection.

Password program 110 determines to grant access to the resource (step 312). In this embodiment, password program 110 grants access to the resource (i.e., online bank account) for which the received password was verified. Password program 110 has the ability to display a notice in a user interface recommending the user change the password entry if the number of attempts to verify the received password exceeds a threshold. For example, if the received password has to be re-entered twice in three consecutive instances where a resource with password protection is being accessed, then password program 110 can prompt a notice on the user interface recommending to change the password. Furthermore, the recommendation can include at least a suggestion of altering the characters of the password entry or altering the input methods for the password entry based on where there may be a recurring instance of the password not matching in the verification process of password program 110.

Password program 110 determines if the attempt number is less than a number (M) of permissible attempts when characters do not match (decision step 314). In the event password program 110 determines the attempt number is less than M ("yes" branch, step 314), password program 110 allows for the user to re-enter a password by displaying the password verification notice (step 304). In the event password program 110 determines the attempt number is not less than M ("no" branch, step 314), password program 110 displays a password verification attempt number exceeded notice (step 318).

Password program 110 determines if the attempt number is less than a number (N) of permissible attempts when input methods do not match (decision step 316). In the event password program 110 determines the attempt number is less than N ("yes" branch, step 316), password program 110 allows for the user to re-enter a password by displaying the password verification notice (step 304). In the event password program 110 determines the attempt number is not less than N ("no" branch, step 314), password program 110 displays a password verification attempt number exceeded notice (step 318).

Password program 110 displays a password verification attempt number exceeded notice (step 318). In this embodiment, password program 110 is no longer capable of receiving a password for verification due to an excessive attempt number. Password program 110 can display the notice in user interface 114 on client device 104. In another embodiment, password program 110 has the ability to display the password verification attempt number exceeded notice for a specified duration, where displaying the notice prevents a user from re-entering a password for verification. In one example, an administrative user of password program 110 can set the specified duration for 15 minutes, where after 15 minutes the user can enter a password for verification and the attempt number count is reverted back to zero.

Figure 4:
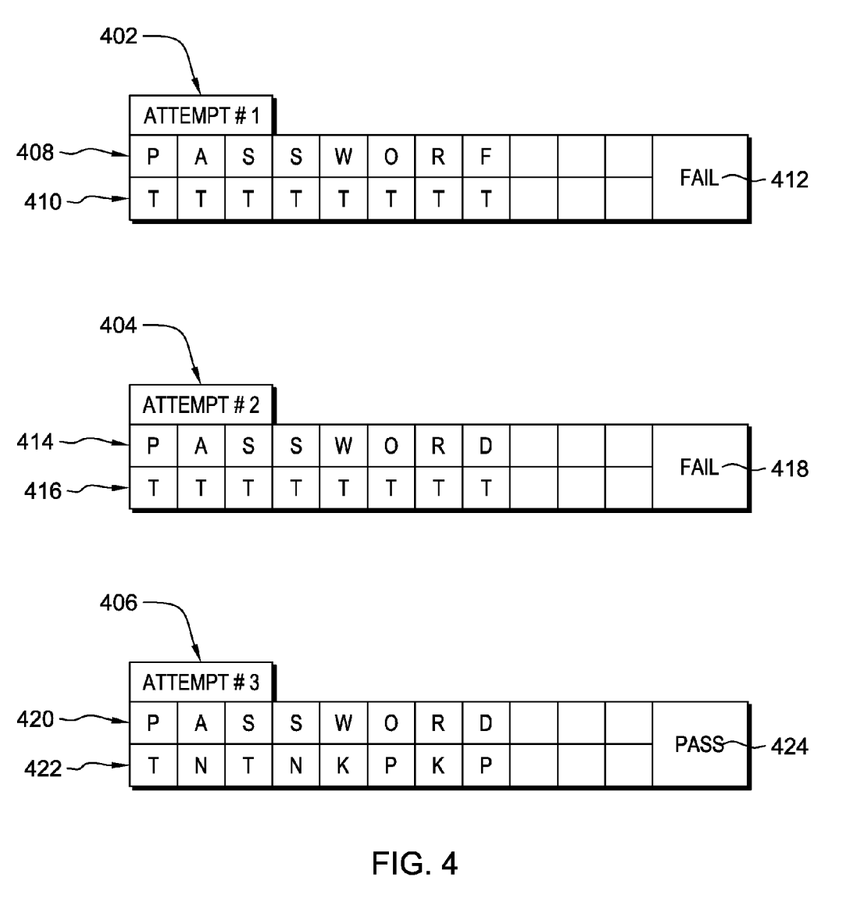
FIG. 4 illustrates an example scenario of a password entry utilizing multiple inputs, in accordance with an embodiment of the present invention.

FIG. 4 illustrates an example scenario of a password entry utilizing multiple inputs, in accordance with an embodiment of the present invention.

In this example scenario, password program 110 receives 3 attempts for a password verification. The password entry in this example scenario is "PASSWORD", where the password entry utilizes a single input method. The single input method is utilizing a virtual keyboard on a touch screen of an electronic device (e.g., client device 104) to enter the characters of a password. The single input method includes the utilization of different parts of a user's hand such as, pads of the fingers, finger tips, knuckles, or nails of the fingers, for entering the password for verification. Block 402 represents a first attempt of password program 110 receiving a password for verification (step 306). Line 408 represents characters entered by the user for the password verification and line 410 represents the input method utilized by the user for entering the password for verification. The abbreviation "T" in line 410 represents that the user utilized a fingertip to enter the corresponding letter in line 408 of the received password for verification. However, since the characters of the received password for verification of "PASSWORF" do not match the password entry "PASSWORD", password program 110 determines the received password fails the verification, as shown in block 412.

Block 404 represents a second attempt of password program 110 receiving a password for verification (step 306). Line 414 represents characters entered by the user for the password verification and line 416 represents the input method utilized by the user for entering the password for verification. For the second attempt, the characters of the received password for verification of "PASSWORD" do match the password entry "PASSWORD". However, password program 110 determines the input method utilized for the received password entry in line 416 is incorrect. Password program 110 determines the received password fails the verification, as shown in block 418.

Block 406 represents a third attempt of password program 110 receiving a password for verification (step 306). Line 420 represents characters entered by the user for the password verification and line 422 represents the input method utilized by the user for entering the password for verification. For the third attempt, the characters of the received password for verification of "PASSWORD" do match the password entry "PASSWORD". Password program 110 also determines the input method utilized for the received password entry in line 420 matches the input method utilized for the password entry. Password program 110 determines the received password passes the verification, as shown in block 424 and password program 110 can determine to grant access to a resource for which the password verification was needed.

Figure 5:
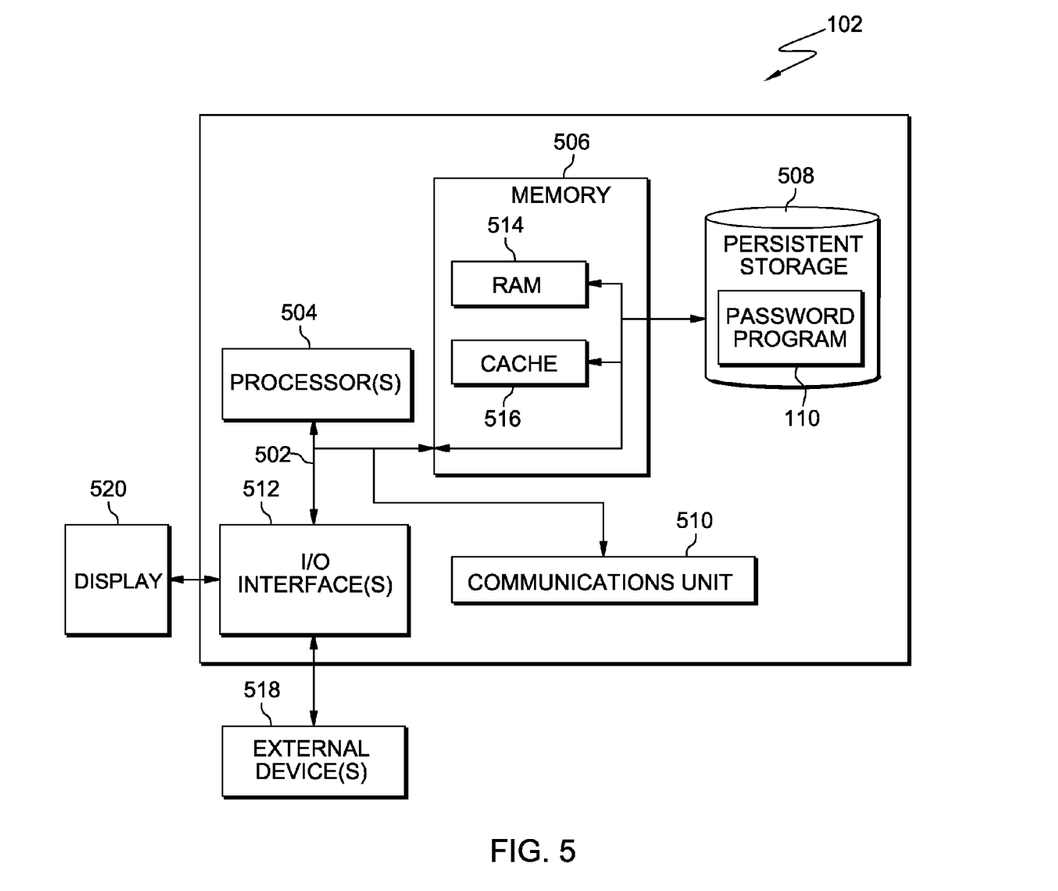
FIG. 5 is a block diagram of components of a computer system, such as the computer server of FIG. 1, in accordance with an embodiment of the present invention.

FIG. 5 depicts a block diagram of components of a computer, such as server computer 102, hosting password program 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. In general, memory 506 can include any suitable volatile or non-volatile computer readable storage device.

Password program 110 is stored in persistent storage 508 for execution by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including systems and devices within or controlled by server computer 102. In these examples, communications unit 510 includes one or more wireless network interface cards. Communications unit 510 may provide communications through the use of either or both physical and wireless communications links. Computer programs and processes, such as index consolidation program 110, may be downloaded to persistent storage 508 through communications unit 510, or uploaded to another system through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 may also connect to a display 520. Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for utilizing one or more input methods for passwords, the computer program product comprising:
one or more computer readable tangible storage media and program instructions stored on at least one of the one or more storage media, the program instructions comprising:
program instructions to determine one or more input methods supported for a password entry, wherein the password entry verifies a user's credentials;
program instructions to receive a candidate password through the one or more input methods, wherein each character of the candidate password has an associated input method;
program instructions to determine if the candidate password meets one or more predetermined criteria, wherein the criteria includes at least one of: a character length and a number of input methods;
program instructions to, responsive to determining the candidate password does meet the criteria, determine to store the password entry based at least on the candidate password and the associated input method for each character of the candidate password;
program instructions to store the candidate password as the password entry, along with the associated input method for each character of the candidate password;
program instructions to receive a first password for verification, wherein verification grants access to a resource;
program instructions to determine each character of the first password matches each of the characters of the password entry;
program instructions to determine that at least one input method for a character of the first password does not match at least one input method for a character of the password entry;
program instructions to determine if a password verification attempt number has been exceeded, where the password verification attempt number represents a number of times a password is received for verification; and
program instructions to, responsive to determining the password verification attempt number has not been exceeded, receive a second password for verification, wherein verification grants access to the resource.

2. The computer program product of claim 1, further comprising program instructions, stored on the one or more computer readable storage media, which when executed by a processor, cause the processor to:
receive a third password for verification, wherein verification grants access to a resource;
determine each character of the third password matches each of the characters of the password entry;
determine each associated input method of each character of the third password matches each associated input method of each character of the password entry; and
determine to grant access to the resource.

3. The computer program product of claim 1, further comprising program instructions, stored on the one or more computer readable storage media, which when executed by a processor, cause the processor to:
receive a third password for verification, wherein verification grants access to a resource;
determine that at least one character of the third password does not match at least one character of the password entry;
determine if a password verification attempt number has been exceeded, where the password verification attempt number represents a number of times a password is received for verification; and
responsive to determining the password verification attempt number has not been exceeded, receive a fourth password for verification, wherein verification grants access to the resource.

4. The computer program product of claim 1, wherein the one or more input methods include one or more of: one or more pads of the fingers, one or more finger tips, one or more knuckles, and one or more nails of the fingers.

5. A computer system for utilizing one or more input methods for passwords, the computer system comprising:
one or more computer processors;
one or more computer readable storage media; and
program instructions stored on the computer readable storage media for execution by at least one of the one or more computer processors, the program instructions comprising:
program instructions to determine one or more input methods supported for a password entry, wherein the password entry verifies a user's credentials;
program instructions to receive a candidate password through the one or more input methods, wherein each character of the candidate password has an associated input method;
program instructions to determine if the candidate password meets one or more predetermined criteria, wherein the criteria includes at least one of: a character length and a number of input methods;
program instructions to, responsive to determining the candidate password does meet the criteria, determine to store the password entry based at least on the candidate password and the associated input method for each character of the candidate password;
program instructions to store the candidate password as the password entry, along with the associated input method for each character of the candidate password;
program instructions to receive a first password for verification, wherein verification grants access to a resource;
program instructions to determine each character of the first password matches each of the characters of the password entry;
program instructions to determine that at least one input method for a character of the first password does not match at least one input method for a character of the password entry;
program instructions to determine if a password verification attempt number has been exceeded, where the password verification attempt number represents a number of times a password is received for verification; and
program instructions to, responsive to determining the password verification attempt number has not been exceeded, receive a second password for verification, wherein verification grants access to the resource.

6. The computer system of claim 5, further comprising program instructions, stored on the one or more computer readable storage media, which when executed by a processor, cause the processor to:
receive a third password for verification, wherein verification grants access to a resource;
determine each character of the third password matches each of the characters of the password entry;
determine each associated input method of each character of the third password matches each associated input method of each character of the password entry; and
determine to grant access to the resource.

7. The computer system of claim 5, further comprising program instructions, stored on the one or more computer readable storage media, which when executed by a processor, cause the processor to:
- receive a third password for verification, wherein verification grants access to a resource;
- determine that at least one character of the third password does not match at least one character of the password entry;
- determine if a password verification attempt number has been exceeded, where the password verification attempt number represents a number of times a password is received for verification; and
- responsive to determining the password verification attempt number has not been exceeded, receive a fourth password for verification, wherein verification grants access to the resource.

8. The computer system of claim 5, wherein the one or more input methods include one or more of: one or more pads of the fingers, one or more finger tips, one or more knuckles, and one or more nails of the fingers.

\* \* \* \* \*